(12) United States Patent
Yang

(10) Patent No.: US 10,764,033 B2
(45) Date of Patent: Sep. 1, 2020

(54) DATA STORAGE METHOD, APPARATUS, SYSTEM AND DEVICE

(71) Applicant: Alibaba Group Holding Limited, George Town (KY)

(72) Inventor: Xinying Yang, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/815,893

(22) Filed: Mar. 11, 2020

(65) Prior Publication Data

US 2020/0213089 A1 Jul. 2, 2020

Related U.S. Application Data

(63) Continuation of application No. PCT/CN2020/071193, filed on Jan. 9, 2020.

(30) Foreign Application Priority Data

Apr. 4, 2019 (CN) .......................... 2019 1 0272439

(51) Int. Cl.
*H04L 29/06* (2006.01)
*H04L 9/06* (2006.01)
*H04L 9/32* (2006.01)

(52) U.S. Cl.
CPC .......... *H04L 9/0637* (2013.01); *H04L 9/0643* (2013.01); *H04L 9/3263* (2013.01); *H04L 9/3297* (2013.01); *H04L 2209/38* (2013.01)

(58) Field of Classification Search
CPC ... H04L 9/0637; H04L 9/3297; H04L 9/3263; H04L 9/0643; H04L 2209/38
See application file for complete search history.

(56) References Cited

U.S. PATENT DOCUMENTS

| | | | |
|---|---|---|---|
| 2016/0019148 A1 | 1/2016 | Vekiarides et al. | |
| 2017/0213209 A1* | 7/2017 | Dillenberger | G06Q 20/3825 |
| 2018/0139278 A1 | 5/2018 | Bathen et al. | |
| 2019/0080284 A1* | 3/2019 | Kim | G06Q 10/0833 |

(Continued)

FOREIGN PATENT DOCUMENTS

| | | |
|---|---|---|
| CN | 103678520 | 3/2014 |
| CN | 106372533 | 2/2017 |

(Continued)

OTHER PUBLICATIONS

Magazzeni et al., "Validation and Verification of Smart Contracts: A Research Agenda", Computer, vol. 50 , Issue: 9 , (Year: 2017).*

(Continued)

*Primary Examiner* — Morshed Mehedi
(74) *Attorney, Agent, or Firm* — Fish & Richardson P.C.

(57) ABSTRACT

Computer-implemented methods, non-transitory, computer-readable media, and computer-implemented systems for data storage are provided. A routing relationship between a data block and a data node is established by using a block hash of the data block. A blockchain-type ledger is stored in a distributed manner with a level of granularity of data block. Metadata such as block header information is stored in a coordinator node. The data block or a block body in the data block is stored in the data node.

20 Claims, 4 Drawing Sheets

(56) References Cited

U.S. PATENT DOCUMENTS

2019/0102761 A1*  4/2019  Pandian ............... H04L 69/08
2019/0394026 A1* 12/2019  Bookman ............ G06Q 30/018
2020/0051011 A1*  2/2020  Dasari ................. H04L 9/3239
2020/0104294 A1*  4/2020  Alas .................... G06F 16/9024

FOREIGN PATENT DOCUMENTS

| CN | 106815258 | 6/2017 |
| CN | 107909369 | 4/2018 |
| CN | 108563771 | 9/2018 |
| CN | 108664222 | 10/2018 |
| CN | 108712488 | 10/2018 |
| CN | 109213797 | 1/2019 |
| CN | 109347893 | 2/2019 |
| CN | 110162523 | 8/2019 |

OTHER PUBLICATIONS

U.S. Appl. No. 16/815,882, filed Mar. 11, 2020, Yang.
U.S. Appl. No. 16/815,902, filed Mar. 11, 2020, Yang.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Search Report and Written Opinion in International Application No. PCT/CN2020/071193, dated Apr. 8, 2020, 21 pages.

* cited by examiner

| Field name | Field type | Field description |
|---|---|---|
| Hash | h256 | Hash value of a data block |
| Version | Uint32_t | Version number |
| Number | Uint64_t | Block height |
| Parent_hash | h256 | Hash value of a parent data block |
| Tx_root | h256 | Merkle tree root hash of a transaction in a block body |
| Time_stamp | Uint64_t | Timestamp |

FIG. 2

DATA STORAGE METHOD, APPARATUS, SYSTEM AND DEVICE

CROSS-REFERENCE TO RELATED APPLICATIONS

This application is a continuation of PCT Application No. PCT/CN2020/071193, filed on Jan. 9, 2020, which claims priority to Chinese Patent Application No. 201910272439.2, filed on Apr. 4, 2019, and each application is hereby incorporated by reference in its entirety.

TECHNICAL FIELD

Implementations of the present specification relate to the field of information technologies, and in particular, to data storage methods, apparatuses, systems, and devices.

BACKGROUND

In a blockchain-type ledger that stores data based on a blockchain data structure (e.g., in a form of a blockchain), data blocks grow rapidly, and data is always stored in a certain node device in a centralized manner. On one hand, such practice imposes a high requirement on a storage capability of the node device. On the other hand, when a quantity of stored data blocks is excessive, it takes a long time to perform an operation (verification or query) on the data blocks.

Based on this, there is a need for a storage solution that is more convenient for a blockchain-type ledger.

SUMMARY

An objective of the implementations of the present application is to provide solutions for implementing convenient storage for a blockchain-type ledger.

To alleviate the previous technical problem, the implementations of the present application are implemented as follows:

A data storage method is applied to a database system that stores blockchain-type ledgers in a centralized manner, where the database system includes a coordinator node and data nodes, and the method includes the following: obtaining, by the coordinator node, a generated data block, determining a data node corresponding to the data block based on a block hash value of the data block, allocating the data block to the corresponding data node, creating routing information between the data block and the data node, and saving the routing information and block header information of the data block; and receiving and storing, by the data node, the data block sent by the coordinator node; where in the blockchain-type ledgers, a data block includes a block header used to store metadata and a block body used to store a data record; and except an initial data block, each data block includes at least one data record and includes its own block hash value that is determined by both the data record included in the data block and a hash value of a previous data block, and block heights of data blocks are increased monotonically based on a block generation time sequence.

Correspondingly, an implementation of the present specification further provides a database system, applied to storage of blockchain-type ledgers. The database system includes a coordinator node and data nodes. In the system: the coordinator node obtains a generated data block, determines a data node corresponding to the data block based on a block hash value of the data block, allocates the data block to the corresponding data node, creates routing information between the data block and the data node, and saves the routing information and block header information of the data block; and the data node receives and stores the data block sent by the coordinator node; where in the blockchain-type ledgers, a data block includes a block header used to store metadata and a block body used to store a data record; and except an initial data block, each data block includes at least one data record and includes its own block hash value that is determined by both the data record included in the data block and a hash value of a previous data block, and block heights of data blocks are increased monotonically based on a block generation time sequence.

Correspondingly, an implementation of the present specification further provides a data storage method, applied to a coordinator node in a database system that stores blockchain-type ledgers in a centralized manner. The method includes the following: obtaining a generated data block; determining a data node corresponding to the data block based on a block hash value of the data block, and allocating the data block to the corresponding data node; and creating routing information between the data block and the data node, and saving the routing information and block header information of the data block.

Correspondingly, an implementation of the present specification further provides a data storage apparatus, applied to a coordinator node in a database system that stores blockchain-type ledgers in a centralized manner. The apparatus includes the following: an acquisition module, configured to obtain a generated data block; an allocation module, configured to determine a data node corresponding to the data block based on a block hash value of the data block, and allocate the data block to the corresponding data node; and a storage module, configured to create routing information between the data block and the data node, and save the routing information and block header information of the data block.

In the solutions provided in the implementations of the present application, a routing relationship between a data block and a data node is established by using a block hash of the data block, a blockchain-type ledger is stored in a distributed manner with a level of granularity of data block, metadata such as block header information is stored in a coordinator node, and the data block or a block body in the data block is stored in the data node. As such, storage load of a single node device can be reduced, and it is conducive to performing operations such as query and verification through multiple processes, thereby improving efficiency.

It should be understood that the previous general description and the following detailed description are merely exemplary and illustrative, and cannot limit the implementations of the present specification.

In addition, there is no need for any implementation of the present specification to achieve full effects described above.

BRIEF DESCRIPTION OF DRAWINGS

To describe the technical solutions in the implementations of the present specification or in the existing technology more clearly, the following briefly describes the accompanying drawings needed for describing the implementations or the existing technology. Clearly, the accompanying drawings in the following description merely show some implementations of the present specification, and a person of ordinary skill in the art can still derive other drawings from these accompanying drawings.

FIG. 2 is a schematic diagram illustrating a block header, according to an implementation of the present specification;

DESCRIPTION OF IMPLEMENTATIONS

To make a person skilled in the art better understand the technical solutions in the implementations of the present specification, the following describes in detail the technical solutions in the implementations of the present specification with reference to the accompanying drawings in the implementations of the present specification. Clearly, the described implementations are merely some but not all of the implementations of the present specification. All other implementations obtained by a person of ordinary skill in the art based on the implementations of the present specification shall fall within the protection scope of the present specification.

The technical solutions provided in the implementations of the present specification are described in detail below with reference to the accompanying drawings.

Figure 1:
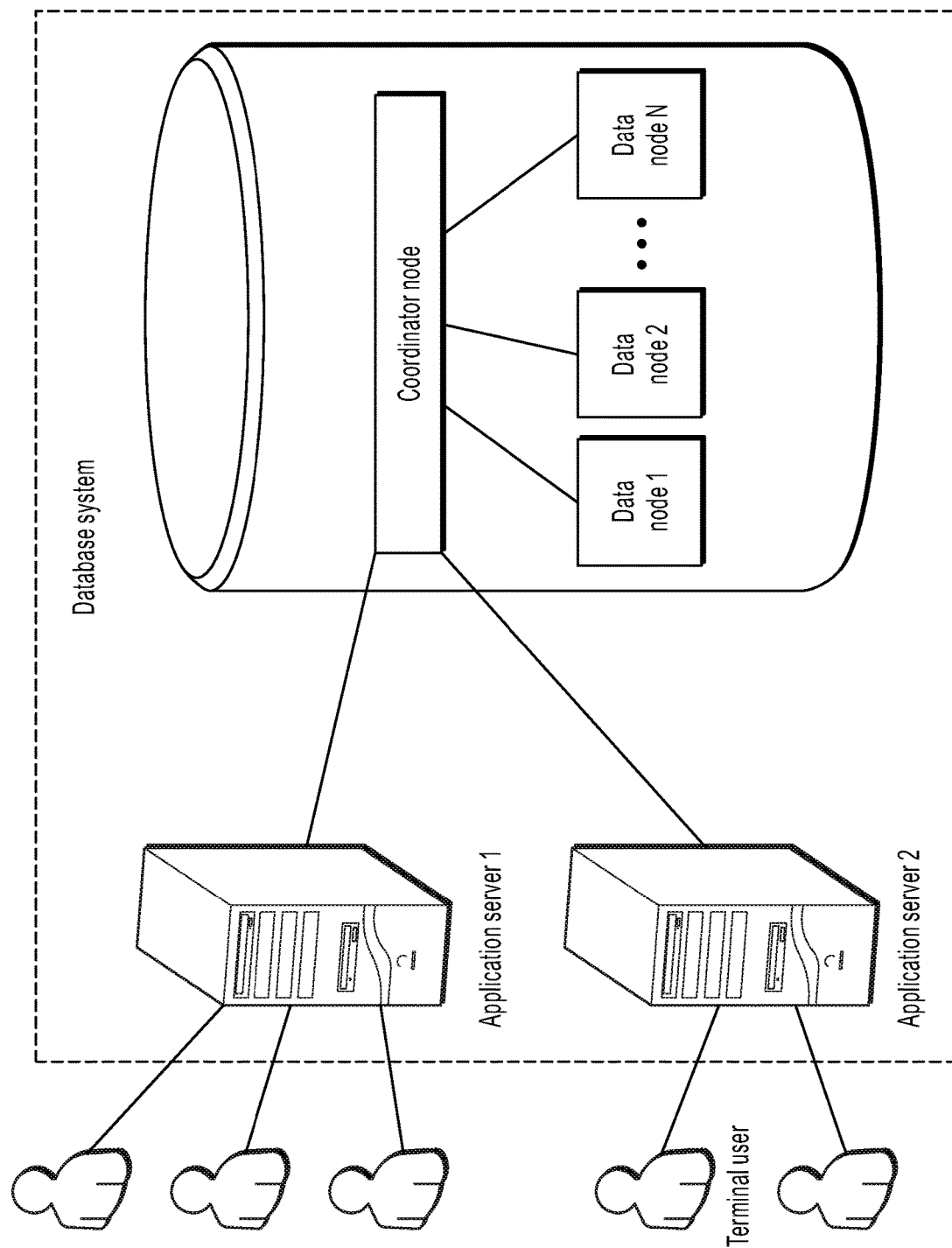
FIG. 1 is a schematic diagram illustrating a system architecture involved in an implementation of the present specification.

First, notably, a database system in the present specification provides a data service in a centralized manner. In a current server architecture, a database server can directly interconnect to a client device of an individual user; or some application servers can interconnect to client devices of individual users, while a database server interconnects to the application servers. In the database system involved in the implementation of the present specification, one coordinator node can correspond to multiple data nodes. FIG. 1 is a schematic diagram illustrating a system architecture involved in the implementation of the present specification.

A data block can be generated in advance in the centralized database system in the implementation of the present specification in the following way:

The database system receives a data record to be stored, and determines a hash value of each data record. The data record to be stored can be various consumption records of a client device of an individual user, or can be a service result, an intermediate state, or an operation record, etc. that is generated when an application server executes service logic based on an instruction of the user. A specific service scenario can include a consumption record, an audit log, a supply chain, a government supervision record, and a medical record, etc.

When a predetermined block generation condition is reached, each data record to be written into a data block is determined and the Nth data block that includes a hash value of the data block and the data record is generated.

The predetermined block generation condition includes the following: a quantity of data records to be stored reaches a quantity threshold, for example, one new data block is generated each time a quantity of received data records reaches 1000, and the 1000 data records are written into the block; or a time interval from a previous block generation moment reaches a time threshold, for example, one new data block is generated every 5 minutes, and data records received in the 5 minutes are written into the block.

N here refers to a sequence number of a data block. In other words, in the implementation of the present specification, the data blocks are arranged in a blockchain-based form in a block generation time sequence, and have a strong time sequence characteristic. Block heights of the data blocks are increased monotonically based on the block generation time sequence. A block height can be a sequence number. In this case, a block height of the Nth data block is N. The block height can also be generated by using another method.

When N=1, the data block is an initial data block. A hash value and a block height of the initial data block are given based on a predetermined method. For example, if the initial data block does not include a data record, the hash value is any given hash value, and the block height blknum is equal to 0. For another example, a trigger condition for generating the initial data block is the same as a trigger condition for another data block, but the hash value of the initial data block is determined by performing a hash operation on all content in the initial data block.

When N>1, because content and a hash value of a previous data block are already determined, a hash value of a current data block (the Nth data block) can be generated based on the hash value of the previous data block (that is, the (N−1)th data block). For example, in a feasible method, a hash value of each data record to be written into the Nth data block is determined, and a Merkle tree is generated based on a sequence of the data records in the block. Then, a root hash value of the Merkle tree is combined with the hash value of the previous data block to generate the hash value of the current block by using a hash algorithm again. In addition, the hash value of the current block can further be generated based on the root hash value of the Merkle tree and some other metadata (for example, a version number or a generation timestamp of the data block). For another example, combination can be performed based on a sequence of the data records in the block and a hash operation can be performed to obtain a hash value of the overall data records. Then, the hash value of the previous data block is combined with the hash value of the overall data records, and a hash operation is performed on a string obtained through the combination, to generate the hash value of the data block.

Each data block includes a block header used to store metadata and a block body used to store a data record. The block header in the data block can be used to store, for example, a parent hash, a block hash value of the data block, a version number, a root hash of a data record, and a timestamp, etc. FIG. 2 is a schematic diagram illustrating a block header, according to an implementation of the present specification. Certainly, a format of the block header can be customized based on a service requirement, and can further include some other information, for example, a status array used to describe a status of a data record. The block body is used to store plaintext of a data record or a hash value of a data record.

In the previously described data block generation method, each data block can be determined by using a hash value, and the hash value of the data block can be determined by content and a sequence of data records in the data block and the hash value of the previous data block. A user can initiate verification at any time based on a hash value of a data block. Modification to any content in the data block (including modification to content or a sequence of data records in the data block) causes inconsistency between a hash value of the data block that is calculated during verification and a hash value obtained when the data block is generated. Consequently, the verification fails and tamper-resistance can be implemented in the centralized manner.

Notably, the previously described data block generation can be implemented in or not in the coordinator node. For example, the database system can further include another service node, which is specifically configured to handle data block generation, so as to implement service decoupling. Once a data block is generated, the service node sends the data block to the coordinator node.

Figure 3:
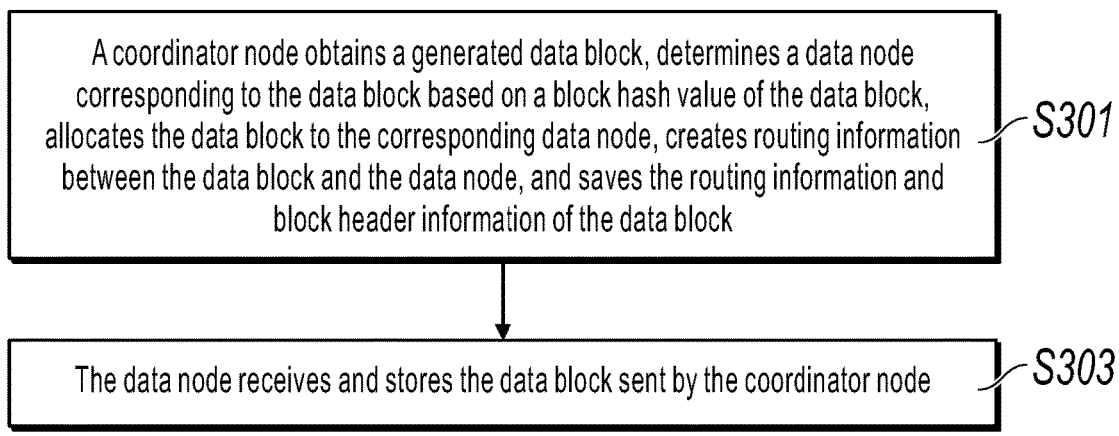
FIG. 3 is a schematic flowchart illustrating a data storage method applied to a database system, according to an implementation of the present specification.

After obtaining the data block, the coordinator node in the database system needs to store the data block. FIG. 3 is a schematic flowchart illustrating a data storage method applied to a database system, according to an implementation of the present specification. The process includes the following steps.

S301: A coordinator node obtains a generated data block, determines a data node corresponding to the data block based on a block hash value of the data block, allocates the data block to the corresponding data node, creates routing information between the data block and the data node, and saves the routing information and block header information of the data block.

There are generally multiple data nodes in the database system. For this reason, the coordinator node first needs to determine which data node that a data block should be allocated to. Specifically, the coordinator node can perform the allocation based on a hash value of the data block.

As described above, the hash value of the data block can be obtained through calculation based on both a parent hash and a hash of a data record of the data block, and can be stored in a block header. Hash values (hash values) are obtained by using a hash function (hash function). Supported algorithms include MACTripleDES, MD5, RIPEMD160, SHA1, SHA256, SHA384, and SHA512, etc. In short, a block hash value of a data block is a relatively short string, and can uniquely identify the data block. A small change to any content in the data block causes a large change to the hash value of the data block.

A quantity of data nodes is generally fixed, and each data node can correspond to a serial number. Therefore, the hash value can be converted into a corresponding numerical value, and a modulo operation can be performed on the quantity of data nodes. As such, the data node corresponding to the data block can be determined based on a modulo result.

For example, if a block hash value of a data block is converted into a numerical value 100110120, and there are totally 10 data nodes numbered from 0 to 9, it can be determined that a modulo result for the block hash value is 0, tree node 0 is a data node corresponding to the block hash value, and the data block can be sent to data node 0 for storage.

Because a block hash value of a data block generally has hundreds of places (a quantity of places is determined based on a hash algorithm), a specified quantity of places (for example, last three places) can be selected from the block hash value for numerical value conversion, so that a modulo operation can be performed to determine a data node corresponding to the data block, thereby reducing a calculation amount.

For another example, all data nodes can also be arranged on an end-to-end hash ring, for example, a hash ring with a size from 0 to $2^{32}$. Each data node can be located at a certain point on the hash ring based on a hash value corresponding to an address or a device identifier of the data node. Each block hash value can be located at a certain location on the hash ring based on the same principle, so that a data node appearing first in a clockwise or counterclockwise direction can be used as a data node corresponding to the block hash value.

After a data node corresponding to a data block is determined, a piece of routing information related to the data block can be created and written into a routing table in the coordinator node. Specifically, a routing table can be locally stored and include information such as a data block height, a data block hash, and a data node serial number corresponding to a data block.

In addition, the coordinator node also needs to store block header information of each data block in addition to storing the routing information.

S303: The data node receives and stores the data block sent by the coordinator node.

In the solutions provided in the implementations of the present application, a routing relationship between a data block and a data node is established by using a block hash of the data block, a blockchain-type ledger is stored in a distributed manner with a level of granularity of data block, and metadata such as block header information is stored in a coordinator node. As such, storage load of a single node device can be reduced, and it is conducive to performing operations such as query and verification through multiple processes, thereby improving efficiency and bringing more convenience.

In an implementation, the coordinator node can further send only a block body of a data block and an identifier to a data node. In this case, the data node only needs to store a mapping relationship between the block body and the identifier. There can be multiple types of identifiers for a block body of a data block, for example, a block height of the data block and/or a block hash of the data block. In such a method, the routing information in the coordinator node includes a block body identifier and a data node serial number. The previously described method can reduce data transmission overheads of the coordinator node and save storage space of the data node.

In an implementation, the coordinator node can further obtain and store a time service certificate.

As described above, in the blockchain-type ledger, except an initial data block, each data block includes at least one data record and includes its own hash value that is determined by both the data record included in the data block and a hash value of a previous data block, and block heights of data blocks are increased monotonically based on a block generation time sequence. The database system can determine, from generated data blocks, a segment of a ledger that needs time service authentication. The segment of the ledger should include at least one data block or multiple data blocks with consecutive block heights. A method for determining the segment of the ledger can be specified based on a user operation. For example, a user initiates a time service instruction, and the instruction includes a start block height and a block quantity that are needed for the time service authentication. The segment of the ledger is used as a target ledger.

The target ledger can also be automatically specified by a service provider based on predetermined service logic, instead of being specified by a user. For example, in terms of the finest level of granularity, time service application is available for each data block. In such a method, a root hash of a Merkle tree of a segment of a ledger is a block hash value of the data block. The method can ensure authenticity of a ledger (namely, each data block) to the maximum extent. The method causes relatively high cost overheads for both a time service center and the service provider due to a high data block generation frequency.

In an optional method, a specific predetermined time service condition is set, and when the predetermined time service condition is satisfied, a time service request is initiated. When newly generated data blocks are all considered as data blocks that are about to undergo time service authentication, the predetermined time service condition can be as follows: A quantity of data blocks that are about to undergo time service authentication reaches a quantity threshold, or a time interval from previous time service authentication reaches a time threshold.

A Merkle tree corresponding to the target ledger is generated based on a block height sequence of the data blocks in the target ledger, and a root hash of the Merkle tree is determined based on a block hash of each data block. Due to dependency of chained data blocks in blockchain-type ledgers, the Merkle tree here only needs to be generated based on a sequence of the data blocks. A conventional calculation method is used as a specific root hash calculation method, and details are omitted here for simplicity.

The root hash of the Merkle tree is used as a root hash of the target ledger, and related information of the root hash and the data blocks is sent to a time authority. The related information of the data blocks includes a start data block height and an end data block height. For example, the time authority can be the National Time Service Center or a corresponding time service institution authorized by the National Time Service Center. The time authority provides a trusted timestamp upon receiving the preceding information, and performs digital signature authentication on the trusted timestamp to generate a time service certificate that includes the trusted timestamp and a digital signature. The time service certificate can further include related information of the preceding data blocks, and a digital signature method can be conventional private key-based encryption and public key-based decryption.

The database system receives a time service certificate that corresponds to the target ledger and that is returned by the time authority, and sends the time service certificate to the coordinator node. The time service certificate includes the start data block height, the end data block height, a trusted timestamp, and the root hash of the target ledger. Therefore, the coordinator node can receive a series of trusted time service certificates that each include a signature of the time authority, and each time service certificate includes a trusted timestamp and corresponds to a segment of ledger. The time service certificate can prove that the segment of the ledger corresponding to the time service certificate is generated before the trusted timestamp. A specific partial ledger can be clarified by using related information in the time service certificate.

The coordinator node can correspondingly store and verify the series of time service certificates. In other words, a time service certificate can also be considered as metadata of a segment of a ledger and stored in the coordinator node. A related operation with a level of granularity of block can be performed only on the coordinator node.

For example, the coordinator node can sequentially number each time service certificate. A time service certificate-related database or index can be established. The database or the index includes a mapping table between a time service certificate number and a root hash value of a segment of a ledger corresponding to a start data block height, an end data block height, and a time service certificate.

In the solutions provided in the implementations of the present application, a routing relationship between a data block and a data node is established by using a block hash of the data block, a blockchain-type ledger is stored in a distributed manner with a level of granularity of data block, and metadata such as block header information is stored in a coordinator node, so that storage load of a single node device can be reduced. In addition, a time service certificate is generated based on a block header of a data block. Therefore, related collection of a segment of a ledger can be completed on the coordinator node, and an operation such as verification or query with the level of granularity of block can also be completed only on the coordinator node, without affecting data storage of a data node. When full data record verification needs to be performed, a verification operation can be decomposed and performed on data nodes based on routing information for distributed parallel verification, thereby greatly improving efficiency.

Correspondingly, an implementation of the present specification further provides a database system, which is applied to storage of blockchain-type ledgers. The database system includes a coordinator node and data nodes. In the system, the coordinator node obtains a generated data block, determines a data node corresponding to the data block based on a block hash value of the data block, allocates the data block to a corresponding data node, creates routing information between the data block and the data node, and saves the routing information and block header information of the data block. The data node receives and stores the data block sent by the coordinator node. In the blockchain-type ledgers, a data block includes a block header used to store metadata and a block body used to store a data record; and except an initial data block, each data block includes at least one data record and includes its own block hash value that is determined by both the data record included in the data block and a hash value of a previous data block, and block heights of data blocks are increased monotonically based on a block generation time sequence.

Further, in the database system, the coordinator node obtains a block header and a block body in the data block, allocates the block body to the corresponding data node, and creates routing information between the block body and the data node; and the data node receives the block body sent by the coordinator node.

Further, in the database system, the coordinator node performs a modulo operation on a quantity of data nodes by using the block hash value, and determines a modulo result as a serial number of the data node corresponding to the data block.

Further, in the database system, the coordinator node obtains and stores a time service certificate, where the time service certificate is generated by a time authority, any time service certificate corresponds to a continuous segment of a ledger, and the time service certificate includes a start data block height, an end data block height, a trusted timestamp, and a root hash of the segment of the ledger, so as to clarify a generation time of the segment of the ledger.

Further, a data block is generated in advance in the database system in the following way: receiving a data record to be stored, and determining a hash value of each data record; and when a predetermined block generation condition is reached, determining each data record to be written into a data block and generating the Nth data block that includes a hash value of the data block and the data record, specifically including: when N=1, giving a hash value and a block height of the initial data block based on a predetermined method; and when N>1, determining the hash value of the Nth data block based on each data record to be written into the data block and a hash value of the (N−1)th data block, and generating the Nth data block that includes the hash value of the Nth data block, each data record, and a block generation time of the data block, where block heights of data blocks are increased monotonically based on a block generation time sequence.

Figure 4:
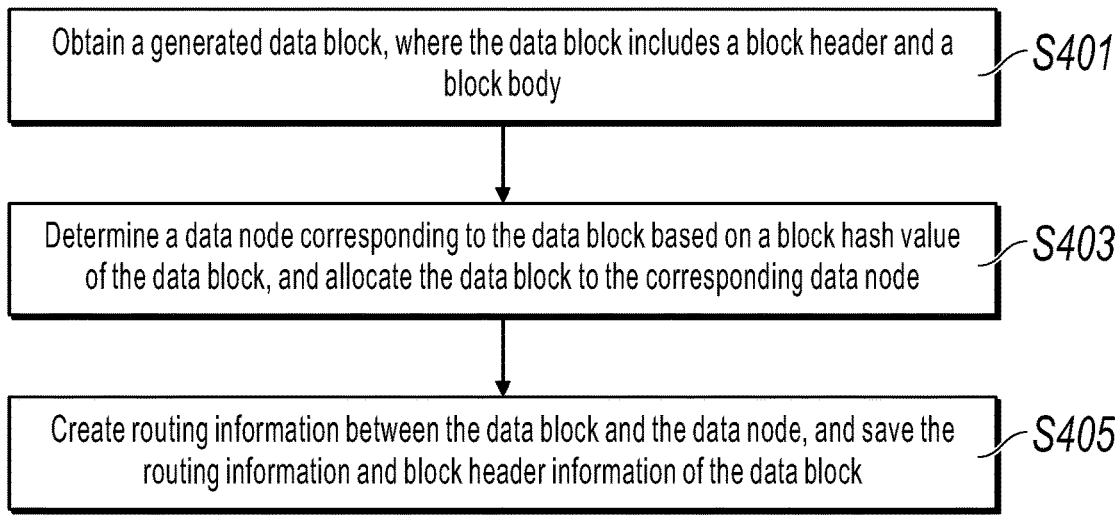
FIG. 4 is a schematic flowchart illustrating a data storage method applied to a coordinator node, according to an implementation of the present specification.

Correspondingly, an implementation of the present specification further provides a data storage method, which is applied to a coordinator node in a database system that stores blockchain-type ledgers in a centralized manner. FIG. 4 is a schematic flowchart illustrating a data storage method applied to the coordinator node, according to an implementation of the present specification. The method includes the following steps:

S401: Obtain a generated data block, where the data block includes a block header and a block body.

S403: Determine a data node corresponding to the data block based on a block hash value of the data block, and allocate the data block to the corresponding data node.

S405: Create routing information between the data block and the data node, and save the routing information and block header information of the data block.

Figure 5:
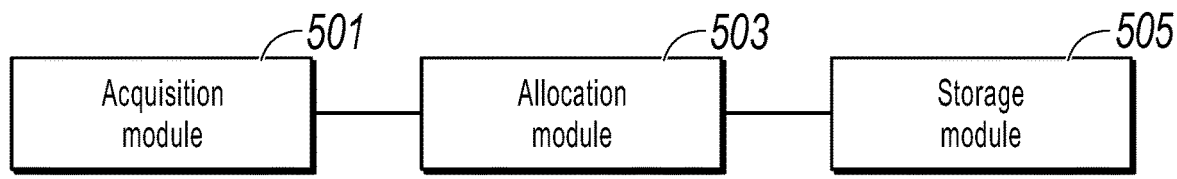
FIG. 5 is a schematic diagram illustrating a data storage apparatus, according to an implementation of the present specification.

Correspondingly, an implementation of the present specification further provides a data storage apparatus, which is applied to a coordinator node in a database system that stores blockchain-type ledgers in a centralized manner. FIG. 5 is a schematic diagram illustrating a data storage apparatus, according to an implementation of the present specification. The apparatus includes the following: an acquisition module 501, configured to obtain a generated data block, where the data block includes a block header and a block body; an allocation module 503, configured to determine a data node corresponding to the data block based on a block hash value of the data block, and allocate the data block to the corresponding data node; and a storage module 505, configured to create routing information between the data block and the data node, and save the routing information and block header information of the data block.

An implementation of the present specification further provides a computer device. The computer device includes at least a memory, a processor, and a computer program that is stored in the memory and that can run on the processor. When executing the program, the processor performs the data storage method shown in FIG. 4.

Figure 6:
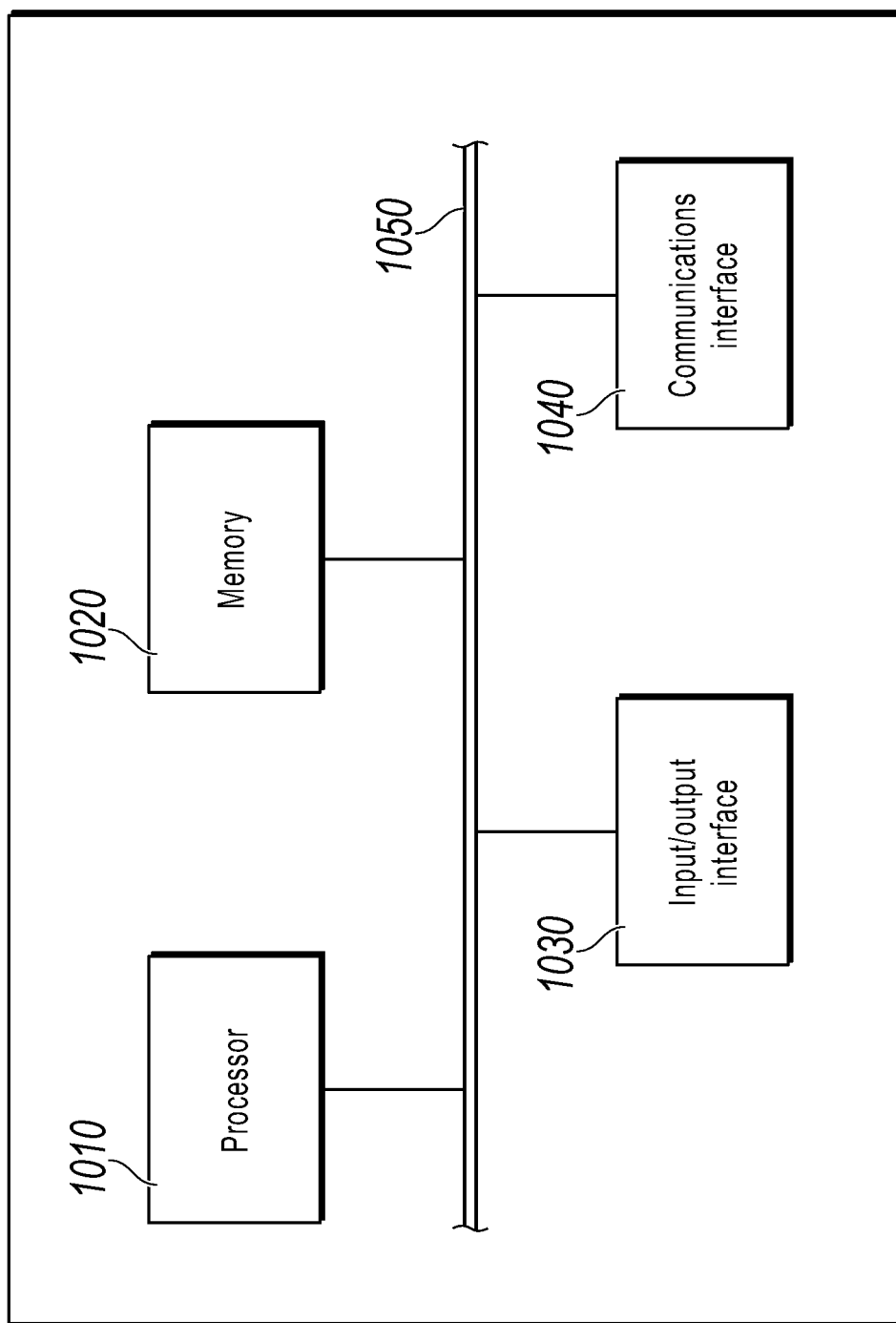
FIG. 6 is a schematic structural diagram illustrating a device for configuring a method in an implementation of the present specification.

FIG. 6 is a more detailed schematic structural diagram illustrating a hardware structure of a computing device, according to an implementation of the present specification. The device can include a processor 1010, a memory 1020, an input/output interface 1030, a communications interface 1040, and a bus 1050. The processor 1010, the memory 1020, the input/output interface 1030, and the communications interface 1040 are connected to and communicate with each other inside the device by using the bus 1050.

The processor 1010 can be implemented by using a general central processing unit (CPU), a microprocessor, an application-specific integrated circuit (ASIC), one or more integrated circuits, etc., and is configured to execute a related program, so as to implement the technical solutions provided in the implementations of the present specification.

The memory 1020 can be implemented by using a read-only memory (ROM), a random access memory (RAM), a static storage device, a dynamic storage device, etc. The memory 1020 can store an operating system and another application program. When the technical solutions provided in the implementations of the present specification are implemented by using software or firmware, related program code is stored in the memory 1020, and is called and executed by the processor 1010.

The input/output interface 1030 is configured to connect to an input/output module, to input or output information. The input/output module (not shown in the figure) can be used as a component and configured in the device, or can be externally connected to the device, to provide a corresponding function. The input device can include a keyboard, a mouse, a touchscreen, a microphone, various sensors, etc. The output device can include a display, a speaker, a vibrator, an indicator, etc.

The communications interface 1040 is configured to connect to a communications module (not shown in the figure), to implement communication interaction between the device and another device. The communications module can perform communication by using a wired (for example, USB or a network cable) or wireless (for example, a mobile network, Wi-Fi, or Bluetooth) method.

The bus 1050 includes one channel, used to transmit information between components (for example, the processor 1010, the memory 1020, the input/output interface 1030, and the communications interface 1040) of the device.

Notably, although only the processor 1010, the memory 1020, the input/output interface 1030, the communications interface 1040, and the bus 1050 of the device are shown, during specific implementation, the device can further include other components necessary for normal running. In addition, a person skilled in the art can understand that the device can include only components necessary for implementing the solutions in the implementations of the present specification, but does not necessarily include all components shown in the figure.

An implementation of the present specification further provides a computer readable storage medium. The computer readable storage medium stores a computer program, and when executed by a processor, the program can implement the data storage method shown in FIG. 4.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. As described in the present specification, the computer readable medium does not include computer readable transitory media (transitory media) such as a modulated data signal and a carrier.

It can be seen from the previous descriptions of the implementations that, a person skilled in the art can clearly understand that the implementations of the present specification can be implemented by using software and a necessary general hardware platform. Based on such an understanding, the technical solutions in the implementations of the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (which can be a personal computer, a server, a network device, etc.) to perform the method described in the implementations of the present specification or in some parts of the implementations of the present specification.

The system, method, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

The implementations in the present specification are described in a progressive way. For same or similar parts of the implementations, references can be made to the implementations mutually. Each implementation focuses on a difference from other implementations. Particularly, an apparatus implementation is similar to a method implementation, and therefore is described briefly. For a related part, references can be made to some descriptions in the method implementation. The previously described apparatus implementations are merely examples. The modules described as separate parts can or cannot be physically separate. During implementation of the solutions in the implementations of the present specification, functions of the modules can be implemented in one or more pieces of software and/or hardware. Some or all of the modules can be selected based on an actual need to implement the solutions of the implementations. A person of ordinary skill in the art can understand and implement the implementations of the present specification without creative efforts.

The previous descriptions are merely specific implementations of the implementations of the present specification. It should be noted that a person of ordinary skill in the art can further make several improvements or polishing without departing from the principle of the implementations of the present specification, and the improvements or polishing shall fall within the protection scope of the implementations of the present specification.

What is claimed is:

1. A computer-implemented method for data storage, comprising:
    obtaining, by a coordinator node, a data block, wherein the coordinator node is in a database system that stores data in blockchain-type ledgers, and wherein the database system comprises the coordinator node and one or more data nodes;
    determining, by the coordinator node, a data node corresponding to the data block based on a block hash value of the data block;
    allocating, by the coordinator node, the data block to the data node;
    creating, by the coordinator node, routing information between the data block and the data node;
    saving, by the coordinator node, the routing information and block header information of the data block; and
    sending, by the coordinator node to the data node, the data block to be stored by the data node in a blockchain-type ledger that stores a plurality of data blocks in a blockchain data structure, wherein:
        in the blockchain-type ledger, each of the plurality of data blocks comprises a block header used to store metadata and a block body used to store a data record; and
        except for an initial data block, each of the plurality of data blocks comprises at least one data record and its own block hash value that is determined by both the at least one data record comprised in the each of the plurality of data blocks and a hash value of a previous data block, and block heights of the plurality of data blocks are increased monotonically according to a block generation time sequence.

2. The computer-implemented method according to claim 1, wherein allocating, by the coordinator node, the data block to the data node comprises:
    obtaining, by the coordinator node, a block header and a block body in the data block;
    allocating, by the coordinator node, the block body to the data node; and
    correspondingly, wherein creating routing information between the data block and the data node comprises:
        creating routing information between the block body and the data node; and
    correspondingly, the sending the data block comprises:
        sending the block body.

3. The computer-implemented method according to claim 1, wherein determining a data node corresponding to the data block based on a block hash value of the data block comprises:
    performing a modulo operation on a quantity of data nodes by using the block hash value; and
    determining a modulo result as a serial number of the data node corresponding to the data block.

4. The computer-implemented method according to claim 1, further comprising:
    obtaining and storing, by the coordinator node, a time service certificate, wherein the time service certificate is generated by a time authority, the time service certificate corresponds to a segment of a ledger that is continuous, the time service certificate comprises a start data block height, an end data block height, a trusted timestamp, and a root hash of the segment of the ledger, and the time service certificate clarifies a generation time of the segment of the ledger.

5. The computer-implemented method according to claim 1, further comprising generating a data block in advance, and wherein generating a data block in advance comprises:
    receiving a data record to be written in an Nth data block;
    determining a hash value of the data record; and
    if a predetermined block generation condition is reached:
        determining the data record; and
        generating the Nth data block that comprises the data record and the hash value of the data block.

6. The computer-implemented method according to claim 5, wherein generating the Nth data block that comprises the data record and the hash value of the data block comprises:
    if N=1, giving a hash value and a block height of the initial data block based on a predetermined methodology.

7. The computer-implemented method according to claim 5, wherein generating the Nth data block that comprises the data record and the hash value of the data block comprises:
    if N>1:
        determining the hash value of the Nth data block based on the data record to be written into the Nth data block and a hash value of a (N−1)th data block; and generating the Nth data block that comprises the hash value of the Nth data block, the data record to be written into the Nth data block, and a block generation time of the Nth data block, wherein block heights of data blocks are increased monotonically based on a block generation time sequence.

8. A non-transitory, computer-readable medium storing one or more instructions executable by a computer system to perform one or more operations comprising:
obtaining, by a coordinator node in a database system that stores data in blockchain-type ledgers, a data block, wherein the database system comprises the coordinator node and one or more data nodes;
determining, by the coordinator node, a data node corresponding to the data block based on a block hash value of the data block;
allocating, by the coordinator node, the data block to the data node;
creating, by the coordinator node, routing information between the data block and the data node;
saving, by the coordinator node, the routing information and block header information of the data block; and
sending, by the coordinator node to the data node, the data block to be stored by the data node in a blockchain-type ledger that stores a plurality of data blocks in a blockchain data structure, wherein:
in the blockchain-type ledger, each of the plurality of data blocks comprises a block header used to store metadata and a block body used to store a data record; and
except for an initial data block, each of the plurality of data blocks comprises at least one data record and its own block hash value that is determined by both the at least one data record comprised in the each of the plurality of data blocks and a hash value of a previous data block, and block heights of the plurality of data blocks are increased monotonically according to a block generation time sequence.

9. The non-transitory, computer-readable medium according to claim 8, wherein allocating, by the coordinator node, the data block to the data node comprises:
obtaining, by the coordinator node, a block header and a block body in the data block;
allocating, by the coordinator node, the block body to the data node; and
correspondingly, wherein creating routing information between the data block and the data node comprises:
creating routing information between the block body and the data node; and
correspondingly, the sending the data block comprises: sending the block body.

10. The non-transitory, computer-readable medium according to claim 8, wherein determining a data node corresponding to the data block based on a block hash value of the data block comprises:
performing a modulo operation on a quantity of data nodes by using the block hash value; and
determining a modulo result as a serial number of the data node corresponding to the data block.

11. The non-transitory, computer-readable medium according to claim 8, wherein the one or more operations further comprise:
obtaining and storing, by the coordinator node, a time service certificate, wherein the time service certificate is generated by a time authority, the time service certificate corresponds to a segment of a ledger that is continuous, the time service certificate comprises a start data block height, an end data block height, a trusted timestamp, and a root hash of the segment of the ledger, and the time service certificate clarifies a generation time of the segment of the ledger.

12. The non-transitory, computer-readable medium according to claim 8, wherein the one or more operations further comprise generating a data block in advance, and wherein generating a data block in advance comprises:
receiving a data record to be written in an Nth data block;
determining a hash value of the data record; and
if a predetermined block generation condition is reached:
determining the data record; and
generating the Nth data block that comprises the data record and the hash value of the data block.

13. The non-transitory, computer-readable medium according to claim 12, wherein generating the Nth data block that comprises the data record and the hash value of the data block comprises:
if N=1, giving a hash value and a block height of the initial data block based on a predetermined methodology.

14. The non-transitory, computer-readable medium according to claim 12, wherein generating the Nth data block that comprises the data record and the hash value of the data block comprises:
if N>1:
determining the hash value of the Nth data block based on the data record to be written into the Nth data block and a hash value of a (N−1)th data block; and
generating the Nth data block that comprises the hash value of the Nth data block, the data record to be written into the Nth data block, and a block generation time of the Nth data block, wherein block heights of data blocks are increased monotonically based on a block generation time sequence.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
obtaining, by a coordinator node in a database system that stores data in blockchain-type ledgers, a data block, wherein the database system comprises the coordinator node and one or more data nodes;
determining, by the coordinator node, a data node corresponding to the data block based on a block hash value of the data block;
allocating, by the coordinator node, the data block to the data node;
creating, by the coordinator node, routing information between the data block and the data node;
saving, by the coordinator node, the routing information and block header information of the data block; and
sending, by the coordinator node to the data node, the data block to be stored by the data node in a blockchain-type ledger that stores a plurality of data blocks in a blockchain data structure, wherein:
in the blockchain-type ledger, each of the plurality of data blocks comprises a block header used to store metadata and a block body used to store a data record; and
except for an initial data block, each of the plurality of data blocks comprises at least one data record and its own block hash value that is determined by both the at least one data record comprised in the each of the plurality of data blocks and a hash value of a previous data block, and block heights of the plurality of data blocks are increased monotonically according to a block generation time sequence.

16. The computer-implemented system according to claim 15, wherein allocating, by the coordinator node, the data block to the data node comprises:
   obtaining, by the coordinator node, a block header and a block body in the data block;
   allocating, by the coordinator node, the block body to the data node; and
   correspondingly, wherein creating routing information between the data block and the data node comprises:
      creating routing information between the block body and the data node; and
      correspondingly, the sending the data block comprises: sending the block body.

17. The computer-implemented system according to claim 15, wherein determining a data node corresponding to the data block based on a block hash value of the data block comprises:
   performing a modulo operation on a quantity of data nodes by using the block hash value; and
   determining a modulo result as a serial number of the data node corresponding to the data block.

18. The computer-implemented system according to claim 15, wherein the one or more operations further comprise:
   obtaining and storing, by the coordinator node, a time service certificate, wherein the time service certificate is generated by a time authority, the time service certificate corresponds to a segment of a ledger that is continuous, the time service certificate comprises a start data block height, an end data block height, a trusted timestamp, and a root hash of the segment of the ledger, and the time service certificate clarifies a generation time of the segment of the ledger.

19. The computer-implemented system according to claim 15, wherein the one or more operations further comprise generating a data block in advance, and wherein generating a data block in advance comprises:
   receiving a data record to be written in an Nth data block;
   determining a hash value of the data record; and
   if a predetermined block generation condition is reached:
      determining the data record; and
      generating the Nth data block that comprises the data record and the hash value of the data block.

20. The computer-implemented system according to claim 19, wherein generating the Nth data block that comprises the data record and the hash value of the data block comprises:
   if N=1, giving a hash value and a block height of the initial data block based on a predetermined methodology; and
   if N>1:
      determining the hash value of the Nth data block based on the data record to be written into the Nth data block and a hash value of a (N−1)th data block; and
      generating the Nth data block that comprises the hash value of the Nth data block, the data record to be written into the Nth data block, and a block generation time of the Nth data block, wherein block heights of data blocks are increased monotonically based on a block generation time sequence.

* * * * *